United States Patent
Huang et al.

(10) Patent No.: US 9,479,919 B2
(45) Date of Patent: Oct. 25, 2016

(54) NETWORK WITH ISOLATED NODES

(71) Applicant: TELEFONAKTIEBOLAGET L M ERICSSON (PUBL), Stockholm (SE)

(72) Inventors: Vincent Huang, Sollentuna (SE); Marie Gedda, Göteborg (SE); Hjalmar Olsson, Bromma (SE); Alok Sareen, Haninge (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 0 days.

(21) Appl. No.: 14/433,758

(22) PCT Filed: Oct. 12, 2012

(86) PCT No.: PCT/SE2012/051098
§ 371 (c)(1),
(2) Date: Apr. 6, 2015

(87) PCT Pub. No.: WO2014/058368
PCT Pub. Date: Apr. 17, 2014

(65) Prior Publication Data
US 2015/0237492 A1    Aug. 20, 2015

(51) Int. Cl.
*H04B 5/00* (2006.01)
*H04W 8/00* (2009.01)
(Continued)

(52) U.S. Cl.
CPC ............ *H04W 8/005* (2013.01); *H04W 4/008* (2013.01); *H04W 8/08* (2013.01); *H04W 12/04* (2013.01); *H04W 76/021* (2013.01); *H04W 84/18* (2013.01)

(58) Field of Classification Search
USPC .............. 455/90.1, 41.1, 41.2, 41.3
See application file for complete search history.

(56) References Cited

U.S. PATENT DOCUMENTS 7,151,769 B2    12/2006 Stanforth et al.
2007/0242642 A1*    10/2007 Bronez ............... H04W 40/24
370/338

(Continued)

FOREIGN PATENT DOCUMENTS

EP           1517493 A2    3/2005
KR    10-2012-0045349 A    5/2009

OTHER PUBLICATIONS

Lu, R. et al. "Pi: A Practical Incentive Protocol for Delay Tolerant Networks," IEEE Transactions on Wireless Communications, vol. 9, No. 4, XP011306664, Apr. 2010, pp. 1483-1493.

(Continued)

*Primary Examiner* — Ping Hsieh
(74) *Attorney, Agent, or Firm* — Patent Portfolio Builders, PLLC

(57) ABSTRACT

A stationary short-range wireless communication device acts as a node of a network where nodes are isolated from each other and comprises a communication unit detecting at least one mobile wireless device in the vicinity of the node, a data memory provided for node data (ND) and a control unit controlling the transfer of data between the stationary short-range wireless communication device and the mobile wireless device, which transfer comprises the transfer of node data (ND). The mobile wireless device comprises a data memory for node data (ND) and a control unit (60) that receives the data from the node comprising node data (ND), stores the node data (ND) in the data memory, determines if the mobile wireless device is in the vicinity of another network node and if so transfers the node data to the other network node.

19 Claims, 8 Drawing Sheets

(51) Int. Cl.
*H04W 8/08* (2009.01)
*H04W 76/02* (2009.01)
*H04W 4/00* (2009.01)
*H04W 12/04* (2009.01)
*H04W 84/18* (2009.01)

(56) References Cited

U.S. PATENT DOCUMENTS

| | | |
|---|---|---|
| 2009/0086664 A1 | 4/2009 | Wu |
| 2010/0208662 A1 | 8/2010 | Fuste Vilella et al. |
| 2011/0107084 A1* | 5/2011 | Hubner ............... H04L 12/5855 713/153 |
| 2011/0143779 A1 | 6/2011 | Rowe et al. |
| 2013/0278416 A1* | 10/2013 | Button ................. G01S 5/0072 340/539.13 |

OTHER PUBLICATIONS

Pelusi, L. et al. "Opportunistic Networking: Data Forwarding in Disconnected Mobile Ad hoc Networks," IEEE Communications Magazine, XP011143585, Nov. 2006, pp. 134-141.

Dhurandher, S.K. et al. "Performance evaluation of various routing protocols in Opportunistic Networks," XP032124489, 2011, pp. 1067-1071.

Yasmeen, F. et al. "A probabilistic position-based routing scheme for delay-tolerant networks," 12th International Conference on Computer and Information Technology (ICCIT 2009), XP031624532, Dec. 21-23, 2009, pp. 38-93.

W. Zhao et al. "A message ferrying approach for data delivery in Sparse Mobile ad hoc networks" Proceeding MOBIHOC '04 Proceedings of the 5th ACM International Symposium on Mobile Ad Hoc Networking and Computing, [Online] pp. 187-198 Retrieved from the Internet.

Yamamura, S. et al. "Virtual Segment: Store-Carry-Forward Relay-Based Support for Wide-Area Non-Real-time Data Exchange" Intelligent Networking and Collaborative Systems, 2009. INCOS '09. International Conference, [Online] pp. 366-371 Retrieved from the Internet.

Wei Peng et al. "Ferry Route Design with Delay Bounds in Delay-Tolerant Networks" Computer and Information Technology (CIT), 2010 IEEE 10th International Conference, [Online] Jun. 29, 2010, pp. 281-288 Retrieved from the Internet.

Jie Wu et al. "Logarithmic store-carry-forward routing mobile ad hoc networks" IEEE Transactions on Parallel and Distributed Systems, [Online] vol. 18, No. 6, Jun. 2007, pp. 735-748 Retrieved from the Internet.

\* cited by examiner

NETWORK WITH ISOLATED NODES

CROSS REFERENCE TO RELATED APPLICATION(S)

This application is a 35 U.S.C. §371 National Phase Entry Application from PCT/SE2012/051098, filed Oct. 12, 2012, designating the United States, the disclosure of which is incorporated herein in its entirety by reference.

TECHNICAL FIELD

The invention relates to communication between stationary isolated network nodes. More particularly, the invention relates to a stationary short-range wireless communication device acting as a node, a method of communicating node data between a stationary short-range wireless communication device and a mobile wireless device, a mobile wireless device for communication with stationary short-range wireless communication devices and a method of transporting node data from a stationary short-range wireless communication device.

BACKGROUND

There may in some situations exist a desire to form a network with different stationary nodes. Examples of situations where this desire may exist are in public transportation systems and garbage disposal systems. The provision of a new communication infrastructure where such nodes communicate with each other may however be considered to too expensive or too complicated to implement. The use of other existing infrastructures, such as mobile networks, may furthermore be considered to be too expensive to use. This means that the nodes of such a network will be isolated from each other. There may also exist systems with nodes that normally are able to communicate with each other, which nodes however lose this ability because of an emergency situation. Emergencies may for instance occur when communication networks are not functioning because of earthquakes, flooding or even war or terrorist attacks. The situation is thus that there is a network with nodes, but the nodes are isolated from each other. They are not able to establish communication links between each other. The question is thus how communication may be established between the nodes.

Some documents that describe somewhat similar situations are U.S. Pat. No. 7,151,769 and U.S. 2010/0208662. These discuss establishing of connections between access points and mobile devices, obtaining mobile information (ID, travel direction etc.) and calculating transferred data based on battery status, available bandwidth, etc. However, the nodes do communicate with each other for instance using hops.

There is thus a need for a way of providing connectivity between nodes in a system of physically isolated stationary nodes, i.e. not connected to a larger network of other nodes.

SUMMARY

One object of the invention is thus to enable communication between stationary nodes of a network, where the nodes are isolated from each other.

One object is therefore to provide a stationary short-range wireless communication device acting as a node of a network, which device is able to communicate with other nodes despite the nodes being isolated from each other.

This object is according to a first aspect of the invention achieved by a stationary short-range wireless communication device acting as a node of a network in which nodes are isolated from each other. The stationary short-range wireless communication device comprises:

a short-range communication unit for short-range communication with at least one mobile wireless devices and configured to detect the mobile wireless device being in the vicinity of the node, a node data memory provided for node data relating to at least one other node of the network, and a node control unit configured to control the transfer of data between the stationary short-range wireless communication device and the mobile wireless device.

The transfer comprises the transfer of node data in order to enable the mobile wireless device to transport node data between the node and at least one other node of the network.

Another object is to provide a method of communicating node data between a stationary short-range wireless communication device and a mobile wireless device, where the stationary short-range wireless communication device acts as a node of a network in which nodes are isolated from each other in order to allow the node to communicate with other nodes.

This object is according to a second aspect achieved through a method of communicating node data between a stationary short-range wireless communication device and a mobile wireless device, where the stationary short-range wireless communication device acts as a node of a network in which nodes are isolated from each other. The method is performed in the stationary short-range wireless communication device and comprises the steps of:

detecting at least one mobile wireless device in the vicinity of the node, and controlling the transfer of data between the mobile wireless device and the node. The transfer of data comprises transfer of node data, in order to enable the mobile wireless device to transport node data between the node and at least one other node of the network.

In an advantageous variation of the first aspect, the node data memory comprises the node data intended for at least one other node and the node control unit, when controlling the transfer of data, is configured to control the transfer of the node data in the node data memory to the mobile wireless device in order to be transported to the at least one other node.

In a corresponding variation of the second aspect, the controlling of transfer of data comprises controlling the transfer of node data from the node to the mobile wireless device in order to be transported to said at least one other node.

According to a further variation of the first aspect, the node data memory comprises user data intended for the user of the mobile wireless device and the node control unit, when controlling the transfer of data, is configured to also transfer the user data to the mobile wireless device.

According to yet another variation of the first aspect, the short-range wireless communication device further comprises an access limitation providing unit configured to provide an access limitation to the user data, at least a part of which can only be removed when the node data has been delivered to another node.

According to a corresponding variation of the second aspect, the method further comprises providing an access limitation to the user data which can only be removed when the node data has been delivered to another node and the transfer of data to the mobile wireless device also comprises the transfer of user data.

According to a further variation of the first aspect, the access limitation unit is configured to encrypt the user data using at least part of the node data when providing an access limitation.

According to yet another variation of the first aspect, the short-range wireless communication device further comprises a node mapping unit configured to obtain position data of previous positions of a detected mobile wireless device and determine the direction of movement of the mobile wireless device based on the position data. The node control unit is further configured to provide the mobile wireless device with node data intended for a node in the determined direction.

According to a corresponding variation of the second aspect, the method further comprises obtaining position data of previous positions of the mobile wireless device, determining the direction of movement of the mobile wireless device and providing the mobile wireless device with node data intended for a node in the determined direction.

According to a further variation of the first aspect, the short-range wireless communication device further comprises data of the positions of the other nodes of the network and the node mapping unit when determining the direction of movement is configured to determine the direction of movement based on the mobile wireless device having collected node data from other nodes of the network.

According to yet another variation of the first aspect, the node control unit, when controlling the transfer of data between the mobile wireless device and the node is configured to receive node data from a detected mobile wireless device and store it in the node data memory, where the node data originates from another node in the network.

According to a corresponding variation of the second aspect another variation of the first aspect, the controlling of the transfer of data between the mobile wireless device comprises receiving node data from a mobile wireless device, where the node data originates from another node in the network.

It is possible that the detected mobile wireless device that delivers node data has user data linked to this node data, where the user data is provided with an access limitation.

According to yet a further variation of the first aspect, the stationary short-range wireless communication device then further comprises an access limitation removal unit configured to remove the access limitation from the user data.

According to a corresponding variation of the second aspect, the method further comprises removing the access limitation from the user data.

Another object is to provide a mobile wireless device that enables for a stationary short-range wireless communication device acting as a node of a network, to be able to communicate with other nodes despite the nodes being isolated from each other.

This object is according to a third aspect achieved through a mobile wireless device for communication with stationary short-range wireless communication devices acting as nodes of a network that are isolated from each other. The mobile wireless device comprises:
a short-range communication unit for short-range communication with nodes of the network,
a wireless device data memory provided for node data relating to nodes of the network, and
a wireless device control unit configured to
receive, via the short-range communication unit, data from a first node, where the data comprises node data,
store the node data in the wireless device data memory,
determine, using the short-range communication unit, if the mobile wireless device is in the vicinity of another network node, and
if the mobile wireless device is in the vicinity of another network node, to transfer the node data to the other network node.

According to a variation of the third aspect, the mobile wireless device is provided in a vehicle.

Another object is to provide a method of transporting node data from a stationary short-range wireless communication device, which method enables a stationary short-range wireless communication device acting as a node of a network to be able to communicate with other nodes despite the nodes being isolated from each other.

The object is according to a fourth aspect also achieved through a method of transporting node data from a stationary short-range wireless communication device, where the stationary short-range wireless communication device acts as a first node of a network in which nodes are isolated from each other. The method is performed in a mobile wireless device and comprises:
receiving, via a first short-range communication link, data from the first network node, where the data comprises node data,
storing the node data in a wireless device data memory,
determining, using a second short-range communication link, if the mobile wireless device is in the vicinity of another network node, and
if the mobile wireless device is in the vicinity of another network node, transferring the node data to the other network node.

It is possible that the transferring of node data is made after reception of a request from the other network node for such node data.

In an advantageous variation of the third aspect, the wireless device control unit is configured to also receive user data from the first node and the mobile wireless device further comprises a data presenting unit configured to present the user data for a user of the mobile wireless device.

In another variation of the third aspect, the user data is provided with an access limitation and the wireless device control unit is further configured to communicate with the other node in order to have the access limitation removed.

In a corresponding variation of the fourth aspect, the receiving of data comprises receiving user data from the first node, where the user data is provided with an access limitation. The method then further comprises communicating with the other node in order to have the access limitation removed.

The access limitation may be an encryption of the user data using at least a part of the node data as a key.

In yet another variation of the third aspect, the wireless device data memory comprises position data of previous positions of the mobile wireless device and the wireless device control unit is further configured to transfer the position data to the first node before receiving the node data.

In a corresponding variation of the fourth aspect, the method further comprises transferring position data of previous positions of the mobile wireless device to the first node before receiving the node data.

The mobile wireless device may furthermore be uniquely identified using a terminal identifier.

The invention according to the above-mentioned aspects has a number of advantages. It provides connectivity between nodes of a network that are isolated from each other. This is furthermore done with a low cost, simplifies the configuring of a sensor device. The configuration can furthermore be made on a sensor device irrespective of if it is equipped with a user interface or not.

It should be emphasized that the term "comprises/comprising" when used in this specification is taken to specify the presence of stated features, integers, steps or components, but does not preclude the presence or addition of one or more other features, integers, steps, components or groups thereof.

BRIEF DESCRIPTION OF THE DRAWINGS

The invention will now be described in more detail in relation to the enclosed drawings, in which.

DETAILED DESCRIPTION

In the following description, for purposes of explanation, specific details are set forth such as particular architectures, interfaces, techniques, etc. in order to provide a thorough understanding of the invention. However, it will be apparent to those skilled in the art that the invention may be practiced in other embodiments that depart from these specific details.

In other instances, detailed descriptions of well-known devices, circuits and methods are omitted so as not to obscure the description of the invention with unnecessary detail.

The invention is generally directed towards a communication network where the stationary nodes are isolated from each other. The nodes are thereby not able to communicate directly with each other, but have to employ some other means of communication. According to the principles described here the nodes are using mobile wireless devices as data carriers, which mobile wireless devices are external to the system.

Figure 1:
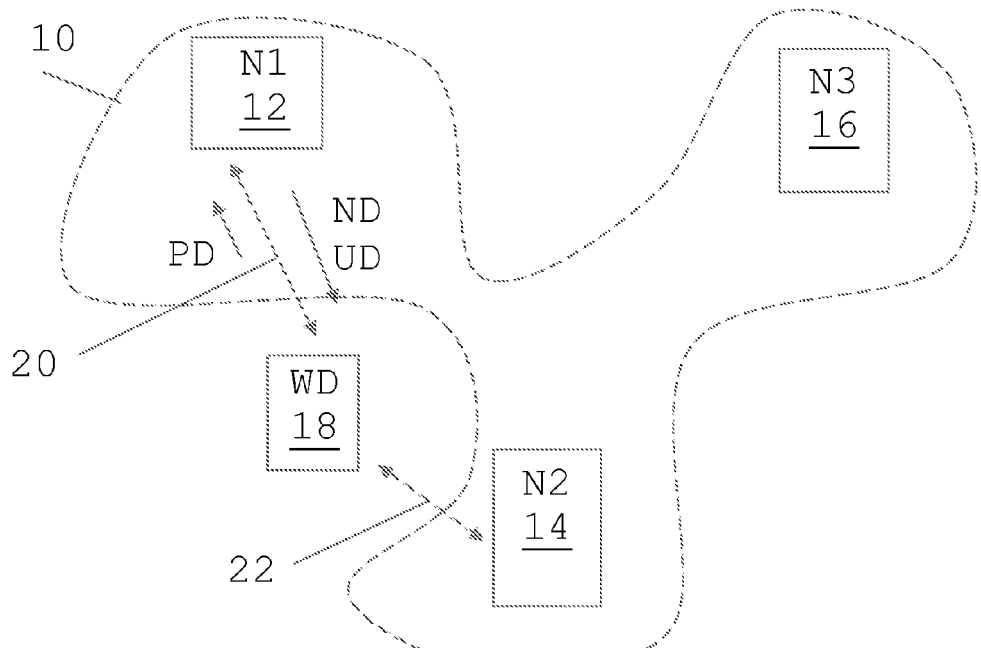
FIG. 1 schematically shows a network with isolated nodes being able to communicate with each other using mobile wireless devices.

In FIG. 1 there is shown a first node N1 12, a second node N2 14 and a third node N3 16, which nodes together form a network 10. However, these nodes, which are stationary, are isolated from each other and thus not able to communicate directly with each other. They may therefore also be considered to be off-line. Instead, they use mobile wireless devices as data carriers, which mobile wireless devices may be the properties of different users. Furthermore, there is no pre-existing association between the mobile wireless devices and the network 10. The mobile wireless devices are thus carried around by users. This is exemplified in FIG. 1 by a first mobile wireless device 18 being carried between the first node 12 and the second node 14. The first node is more particularly shown as communicating with the first node 12 via a first communication link 20 and with the second node 14 via a second communication link 22. The mobile wireless device 18 is also shown as transferring position data PD to the first node 12 over the first communication link 20 and receiving node data ND and user data UD from the first node 12, also over the first communication link 20.

Figure 2:
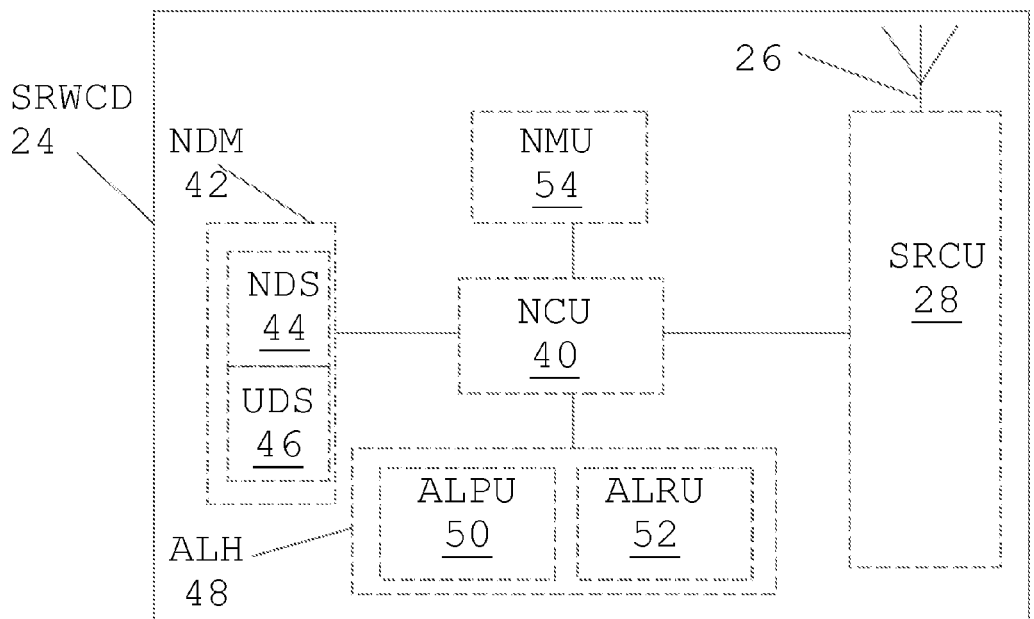
FIG. 2 shows a block schematic of a short-range wireless communication device acting as a node, FIG. 3 schematically shows a block schematic of a mobile wireless device.

FIG. 2 shows a block schematic of a short-range wireless communication device SRWCD 24 that implements such a stationary node. The short-range wireless communication device 24 comprises an antenna 26 connected to a short-range communication unit SRCU 28, which in turn is connected to a node control unit NCU 40. The short-range communication unit SRCU 28 may typically be a unit communicating according to a known and well established standard, such as Near Field Communication (NFC), Bluetooth or IEEE 802.11. However it may also in some cases use short-range communication according to for instance Long Term Evolution (LTE) or Wideband Code Division Multiple Access (WCDMA). The antenna 26 is in FIG. 2 shown as being inbuilt. However, it may also be external.

The node control unit 40 is connected to a node mapping unit 54, to an access limitation handler ALH 48 and to a node data memory NDM 42. The access limitation handler 48 comprises an access limitation provision unit ALPU 50 and an access limitation removing unit ALRU 52. The node data memory 42 comprises a node data section NDS 44 and a user data section UDS 46.

The device may also be connected to one or more sensors (not shown) to measure various physical properties of the environment of the node. Sensor data may be provided to the node data memory 42 for later use. How sensor data may be collected and stored is as such well-known and therefore more or less omitted from this description.

Figure 3:
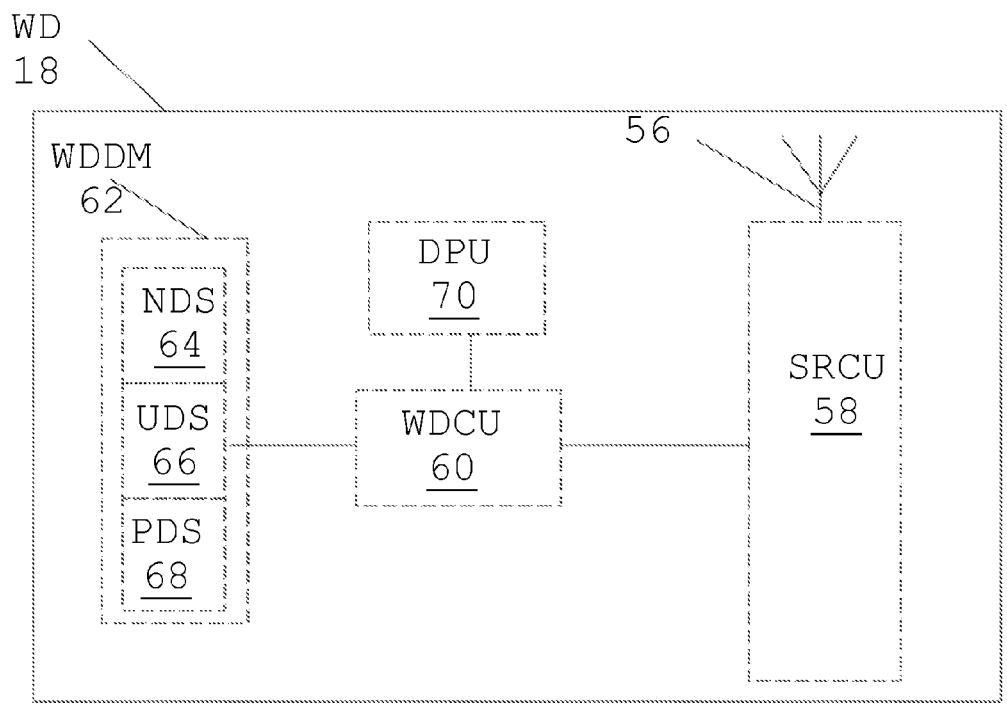

FIG. 3 shows one exemplifying realization of a mobile wireless device WD, which in this case is the first mobile wireless device 18. A mobile wireless device may also be a wireless terminal. It may as an example be a mobile phone, lap top computer, palm top computer or electronic organizer.

The mobile wireless device 18 also comprises an antenna 56 connected to a short-range communication unit SRCU

58. The short-range communication unit 58 is in turn connected to a wireless device control unit WDCU 60. The wireless device control unit 60 is connected to a data presenting unit DPU 70 and to a wireless device data memory WDDM 62. The wireless device data memory 62 may comprise a node data section NDS 64, a user data section UDS 66 and a position data section PDS 68. The antenna 56 is also here shown as being in-built, i.e. provided in the interior of the mobile wireless device 18. It may however also be external.

The short-range communication unit 58 does communicate according to the same communication standard that is used by the short-range wireless communication device. This fact is something that can be used for exchanging data between the network nodes even though they are isolated from each other. This data being exchanged will in the following be termed node data ND.

More and more people gather in big cities and they carry mobile wireless devices. This gives the possibility to use the terminals to transport information or communicate in a cost efficient way.

For example, some basic community services such as recycling stations are not connected to communication networks today. However, there may still be a need for the stations to share information among their neighbours, so that they can provide information to users, such as informing of the type of available stations and their status.

These kinds of services do not require real time updates, but they do require robust and stable transfer of information.

The two way subscription based communications known of today, such as mobile communications, are often more complex and therefore also not so cost efficient. The need of cost efficient transport of data, such as one way communication, therefore increases.

There is thus a need to find a cost efficient way for information sharing among nodes of a network, where the nodes are stationary and isolated from each other.

As was mentioned earlier, many people today own or use mobile wireless devices, such as mobile phones, organizers, lap top and palm top computers. In urban areas these people transport themselves through different routes such as roads, by foot, by railways or underground that can be predicted to some extent. If the number of people is sufficient or the number of route alternatives are low, it may not even be necessary to predict a route. It may be sufficient to provide every mobile wireless device passing by a node with node data and the probability that at least one of these reaches the destination may be high enough.

This vast amount of people, or rather their mobile wireless devices, where the direction of travel is sometimes known, such as on trains or in the underground, could then be used for transporting data between nodes of a network strategically placed along such routes. The combination of more communications/information terminals and possibilities to predict likely routes makes it possible to obtain cost efficient network carrying or transporting information (one way) then not necessarily in real-time.

Aspects of the invention are directed towards utilizing this movement of people for sharing information. This is in some variations combined with the users requesting information and also receiving incentives in return.

In the described network there are no direct connections among the nodes. The data transmission is one to many or one to none. In some variations a stationary node may decide what data a mobile wireless device should carry based on the probability of the movement of this mobile wireless device. The data sharing is furthermore not necessarily deterministic. It normally requires less overhead in the connection set up. It is possible to employ without using bootstrapping, naming and addressing as in normal connections.

Other aspects are directed towards exploiting the fact that user may be interested in some data, user data, which the nodes have to offer.

Users with short-range communication enabled mobile wireless devices can obtain useful information from these nodes, i.e. user data. The user data that may be of interest, may as an example be status of recycling stations, discount coupons, community announcement, etc. While obtaining the user data, the nodes can also piggyback some node data and store it on the mobile wireless device. When the user arrives at the next node, the node data may then be exchanged. In one specific variation of the invention an algorithm is provided for calculating node data to be shared among the nodes and how the node data can be shared securely.

Figure 4:
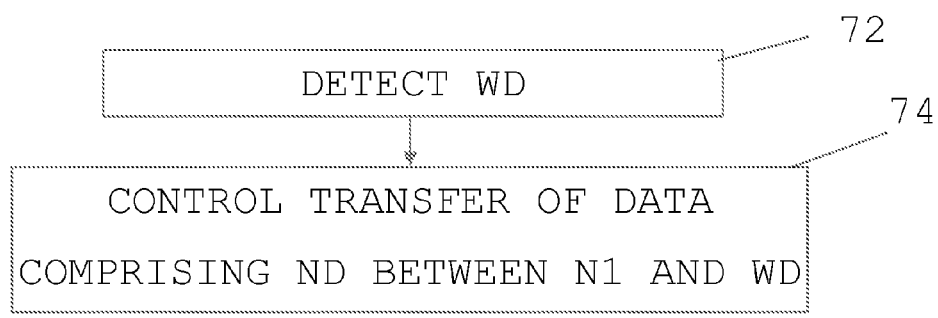
FIG. 4 shows two method steps in a first embodiment of a method of communicating node data between a stationary short-range wireless communication device and a mobile wireless device, FIG. 5 schematically shows a number of method steps in a first embodiment of a method of transporting node data from a stationary short-range wireless communication device, FIG. 6 schematically shows a number of method steps in a first part of a second embodiment of a method of communicating node data between a stationary short-range wireless communication device and a mobile wireless device, FIG. 7 schematically shows a number of method steps in a second embodiment of a method of transporting node data from a stationary short-range wireless communication device, FIG. 8 schematically shows a number of method steps in a second part of the second embodiment of the method of communicating node data between a stationary short-range wireless communication device and a mobile wireless device.
Figure 5:
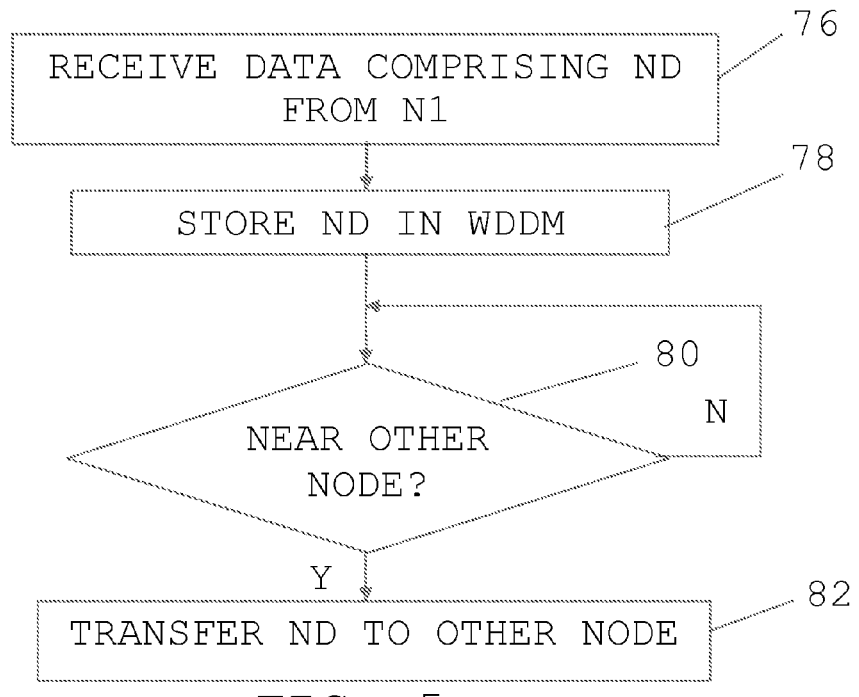

A first embodiment of the invention will now be described with reference being made also to FIG. 4, which shows method steps in a method of communicating node data between a stationary short-range wireless communication device and a mobile wireless device, and to FIG. 5, which schematically shows a number of method steps in a method of transporting node data from a stationary short-range wireless communication device.

The first node 12, which is implemented through the stationary short-range wireless communication device 24 is made aware of the presence of the first mobile wireless device 18, for instance via the use of the short-range communication units. The first mobile wireless device may be uniquely identified using a terminal identifier, such as with International Mobile Equipment Identity (IMEI), International Mobile Subscriber Identity (IMSI) or a Media Access Control (MAC) address of the short-range wireless communication unit 58. The first node may for instance inform mobile wireless devices of its presence via the short-range communication unit 28. If the first mobile wireless device is in the vicinity of the first node 12, it may then respond to this notification. As an alternative the first mobile wireless device 18 may inform the first node about it being present. Information about the first mobile wireless device 18 being present is then forwarded from the short-range communication unit 28 to the node control unit 40. In this way the node control unit 40 detects 72 at least one mobile wireless device in the vicinity of the first node 12 and in this case it detects that the first mobile wireless device 18 is in the vicinity, step 72. The node control unit 40 then obtains node data from the node data section 44 of the node data memory 42 and controls the transfer of data between the first mobile wireless device 18 and the first node, which transfer of data comprises transferring the node data ND, step 74. This may be done through the node control unit 40 providing the short-range communication unit 28 with the node data ND and then controlling the short-range communication unit 28 to transfer this node data ND to the first mobile wireless device 18 via the antenna 26, which is done in order to enable the mobile wireless device 18 to transport data comprising the node data between the first node 12 and at least one other node of the network 10. This transfer may furthermore be made via a first short-range communication link 20 being set up between the two short-range communication units 28 and 58 using antennas 26 and 56. The data transferred this way thus comprises said node data ND. In this embodiment only the node data is transferred. In later described embodiment also other data is transferred, user data.

In this way the short-range communication unit 58 receives data comprising the node data ND from the first node via the first short-range communication link 20, step 76.

The data, which in this embodiment thus only comprises the node data ND is then forwarded from the short-range communication unit 58 to the wireless device control unit 60. The wireless device control unit 60 thus receives the data comprising the node data ND from the short-range communication unit 56. Thereafter it stores the node data in the wireless device data memory 62, step 78. This may be stored anywhere in the memory 62, but may for the purposes of describing the invention be considered to be stored in the node data section 64 of the wireless device data memory 62. It is possible that the node data comprises indications of one or more nodes of the network that are to receive it.

After the mobile wireless device 18 in this way has received the node data ND, it may then be carried by its user to the vicinity of other nodes of the system. It may more particularly be carried to the vicinity of the second node 14.

The wireless device control unit 60 may more particularly determine, using the second short-range communication link 22, if the mobile wireless device 18 is in the vicinity of another network node, step 80. Depending of if the node data ND is intended for all network nodes, some network nodes or specific network nodes of the network 10, some further investigations may be made. If there is no network node in the vicinity, step 80, the wireless device control unit 60 continues to investigate, while if there is, step 80, the node data ND is transferred to the other node, step 82. The investigation of network node may be done through the network node in question, here exemplified by the second network node 14, informing mobile wireless devices of its presence via an own short-range communication unit. It may for instance be set to broadcast such information. The first mobile wireless device 18 may then determine if the notification is from a node in the network and if so possibly also if the node is a node that is to receive the node data ND. As an alternative the first mobile wireless device 18 may inform the second node 14 about it being present, which may cause the second node 14 to answer with an identifier. This identifier may then be used for determining if the node is a node of the network that is to receive the node data or not.

If the node 14 is to receive the node data ND, the second node may then pull the node data from the mobile wireless device. The node 14 may therefore send a request for the node data to the wireless device control unit 60. The wireless device control unit 60 may then fetch the node data ND from the node data section 64 of the wireless device data memory 62 and thereafter transfer it to the second node 14 via the short range communicating unit 58 and antenna 56.

It can in this way be seen that the second node ND receives the node data ND from the first node 12 despite being isolated from each other. The node data may comprise data that is of interest to this second node, for instance above-mentioned sensor measurements.

Figure 8:
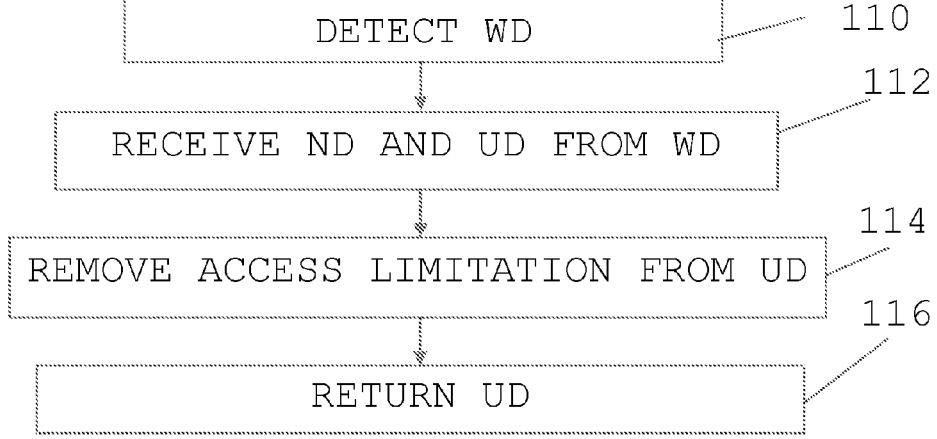
Figure 6:
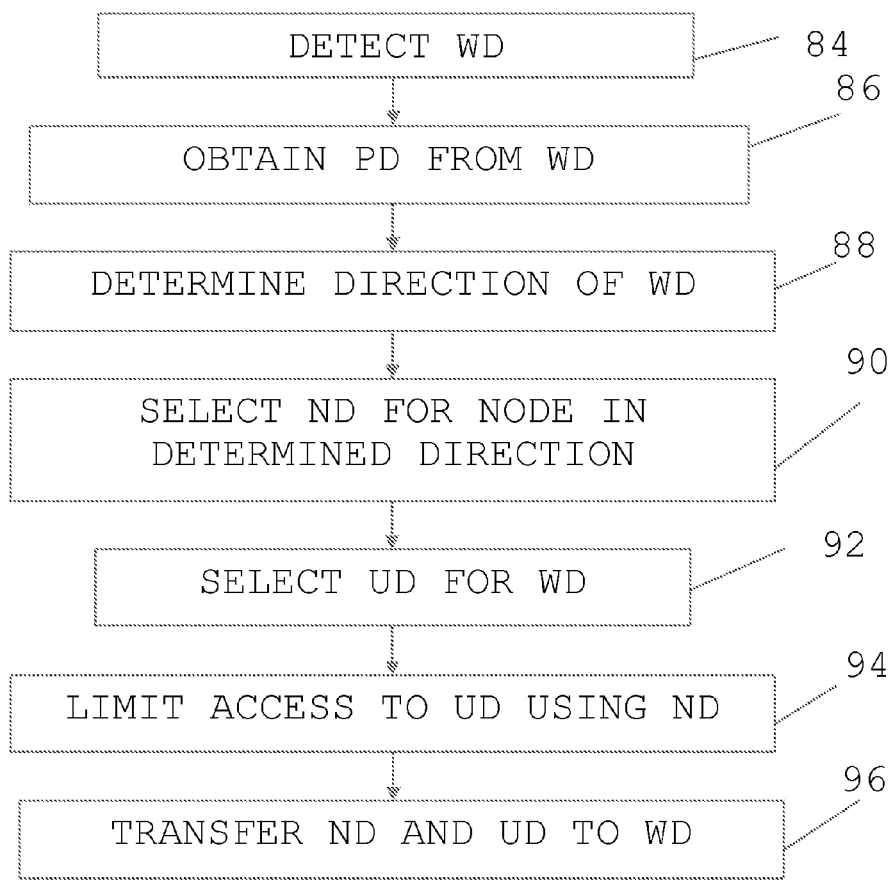
Figure 7:
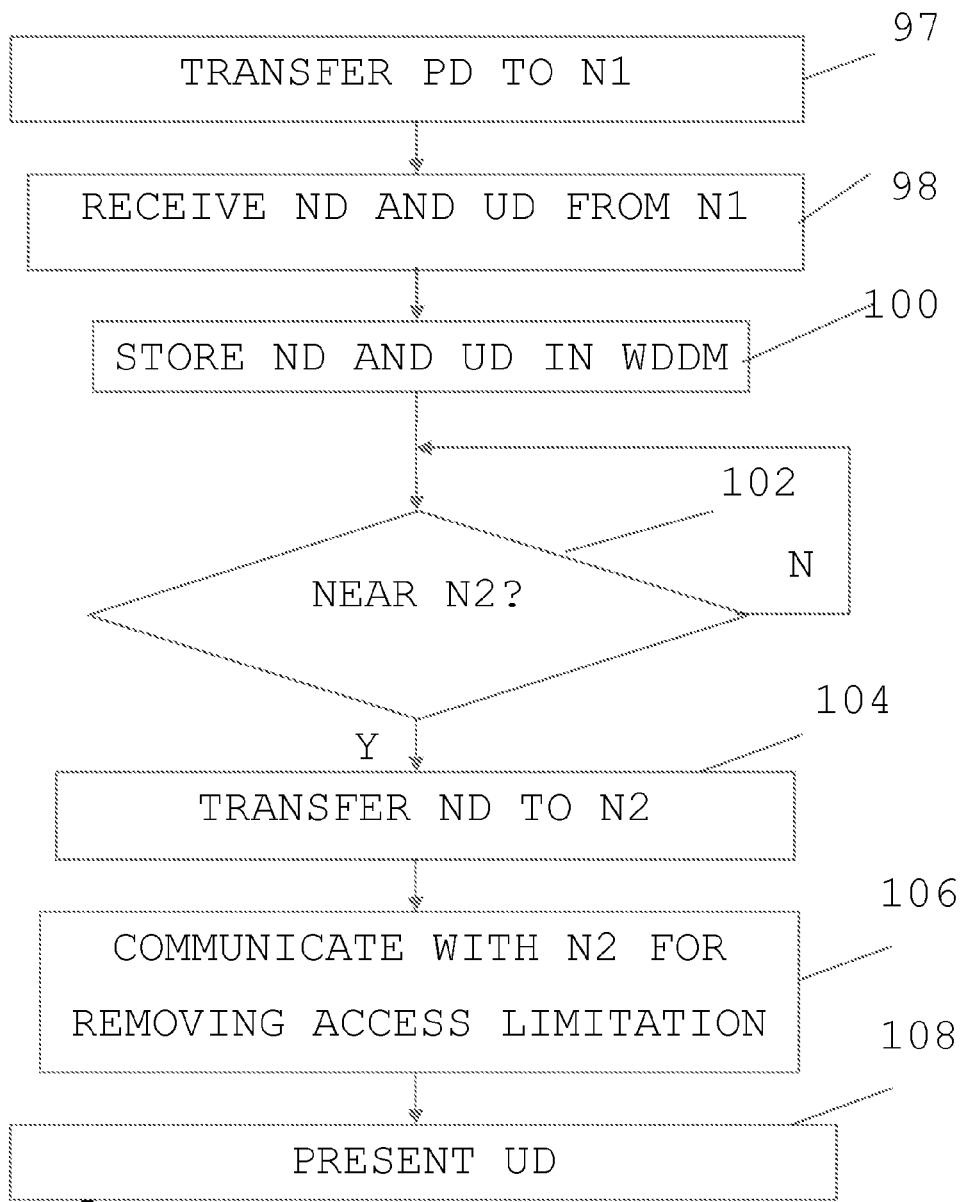

Now a second embodiment will be described with reference being made to FIG. 6, which schematically shows a number of method steps in a first part of a method of communicating node data between a stationary short-range wireless communication device and a mobile wireless device, to FIG. 7, which schematically shows a number of method steps in a method of transporting node data from a stationary short-range wireless communication device and to FIG. 8, which schematically shows a number of method steps in a second part of the method of communicating node data between a stationary short-range wireless communication device and a mobile wireless device.

In this second embodiment the position data of the mobile wireless device is used for determining if it is to receive node data as well as which node data it is to receive.

The method yet again starts with the node control unit 40 of the first node 12 detecting the first wireless terminal 18 using the short-range communication unit 28, step 84. This may be done in the same way as in the first embodiment. Thereafter the node control unit 40 obtains position data PD from the mobile wireless device 18, step 86.

This may be done in the following way. The position data section 68 of the wireless device data memory 62 may comprise data about previous positions held by the mobile wireless device 18. The mobile wireless device may for instance be provided with a Global Positioning System (GPS) unit (not shown) and this may provide data about previous positions occupied by the mobile wireless device. If the mobile wireless device is a mobile phone, it is also possible that the terminal sends a query to a mobile phone network, which may have kept track of the positions of the mobile wireless device for instance using triangulation. The mobile wireless device 18 may also previously have visited other nodes of the network 10 and obtained time stamps of these visits. Knowledge about the location of the nodes can also be used as position data.

The wireless device control unit 60 thus obtains position data PD, for instance from the position data section 68 of the wireless device data memory 62 and transfers this position data PD to the first node 12, step 97.

The node control unit 40 forwards the position data PD to the node mapping unit 54, which determines the direction of the mobile wireless device based on the position data PD, step 88. If there are time indications, such as time stamps, associated with the positions, these may here also be forwarded. The direction may for instance be determined through extrapolating the position data in order to determine or predict the direction of movement of the mobile wireless device 18, step 88. The node mapping unit 54 may have knowledge about the positions of the nodes of the network 10 and may therefore also see if any of these positions match the direction of movement. The node mapping unit 54 then compares the predicted direction of movement with known network node locations. The wireless device control unit 60 is then informed about which nodes, if any, that are located along the predicted direction. The wireless device control unit 60 then determines if any of the nodes along the direction are to receive node data ND. Node data may here be specific node data only intended for a specific node or generic node data intended for one or more nodes, for instance one or more nodes in a certain group.

The node control unit 40 then selects node data ND for a node in the determined direction, step 90. This may be done through fetching node data for this node from the node data section 44 of the node data memory 42. The node control unit 40 furthermore selects user data UD for the mobile wireless device WT, step 92, which may involve obtaining user data UD from the user data section 46 of the node data memory 42.

The user data UD could be an interesting status report comprising sensor measurements made at the node. It could also be some data that gives the user pleasure or amusement, but is not necessarily of any technical use. The user data can basically be anything useful that fits in a binary address. For instance an image, an application, a movie or anything else that would be appreciated by a person passing by.

The node control unit 40 then forwards the node data ND and user data UD to the access limitation providing unit 50 of the access limitation handler 48. The access limitation providing unit 50 then limits the access to the user data UD using the node data ND. This limiting of access may be that the data has a lower resolution, that the data is a section of a file, where different nodes may provide different sections of the file. It may also be that the user data is encrypted. This limiting of the access may be performed through the use of the node data ND. Some or all of the node data ND may for instance be used as an encryption key. Some or all of the node data may thus be a key for lifting some or all of the access limitations. The access limited user data UD and node data ND are then sent to the node control unit 40.

Thereafter the node control unit 40 transfers the node data ND and user data UD to the mobile wireless device 18, step 96.

The short-range communication unit 58 of the mobile wireless device 18 then receives this user data UD and node data ND from the first node 12 and forwards it to the wireless device control unit 60, which in this way receives the data ND and UD, step 98. The wireless device control unit 60 then stores the data in the wireless device data memory 62, step 100, where the node data ND may be stored in the node data section 64 and the user data UD may be stored in the user data section UDS 66. The node data ND may here comprise an indication of the node or nodes that is to receive it. As an example the data is only to be received by the second node 14.

The user then moves with his or her mobile wireless device 18 and may then move to the vicinity of the second node 14. If it is near the second node 14, step 102, then the node data ND is transferred to the second node 14, step 104, while if it is not the mobile wireless device 18 continues to investigate if it is near a node. The investigation may typically be performed by the wireless device control unit 60 using the short-range communicating unit 58 through comparing a stored node identifier with a transmitted node identifier.

The second node 14 is typically also provided in the form of a short-range wireless communication device 24, why it comprises all the elements depicted in FIG. 2.

The node control unit 40 of this node 14 detects the mobile wireless device, step 110, and then receives the node data ND from the mobile wireless device 18. The second node 14 may also here pull the node data ND from the mobile wireless device 18. The node control unit 40 of the second node 14 may therefore send a request for the node data ND to the wireless device control unit 60 and the node data may be transmitted for the mobile wireless device 18 based on such a request being received in the mobile wireless terminal 18. The second node 14 may also receive the user data UD. The node control unit 40 may then investigate if the data is data that is expected in the node and thereafter, the user data UD and perhaps also the node data ND is forwarded to the access limitation removing unit 52 of the access limitation handler 48. The access limitation removing unit 52 then removes some or all of the access limitation from the user data UD, step 114. If the node data ND was used for encryption the same data may be used for decryption. After access limitation removal the user data is then returned, by the node control unit 40, to the mobile wireless device 18, step 116.

The user data UD is then received by the wireless device control unit 60 and may thereafter be presented to the user via the data presenting unit 70, step 108.

It can in this way be seen that node data ND may be provided to different nodes of the network 10.

Furthermore through providing user data, an incentive is given to the user to carry the node data ND.

Furthermore, through providing an access limitation it is also ensured that the user will deliver the node data to a node in order to benefit from the user data.

The user data UD is thus typically used as a reward to the user for carrying the node data to another node and because of this it is sometimes also referred to as Incentive.

Figure 9:
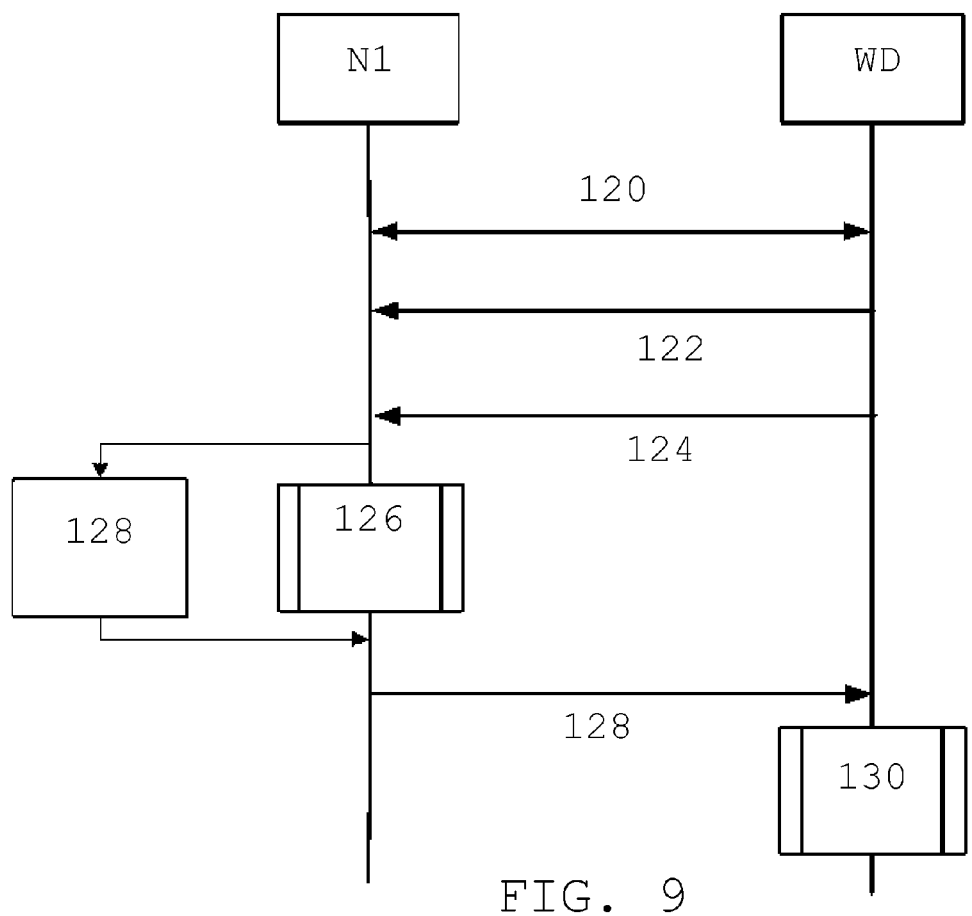
FIG. 9 shows a number of signals transmitted between a first node and mobile wireless device when communicating in a variation of the second embodiment, FIG. 10 schematically shows a number of activities being performed in a first node.
Figure 10:
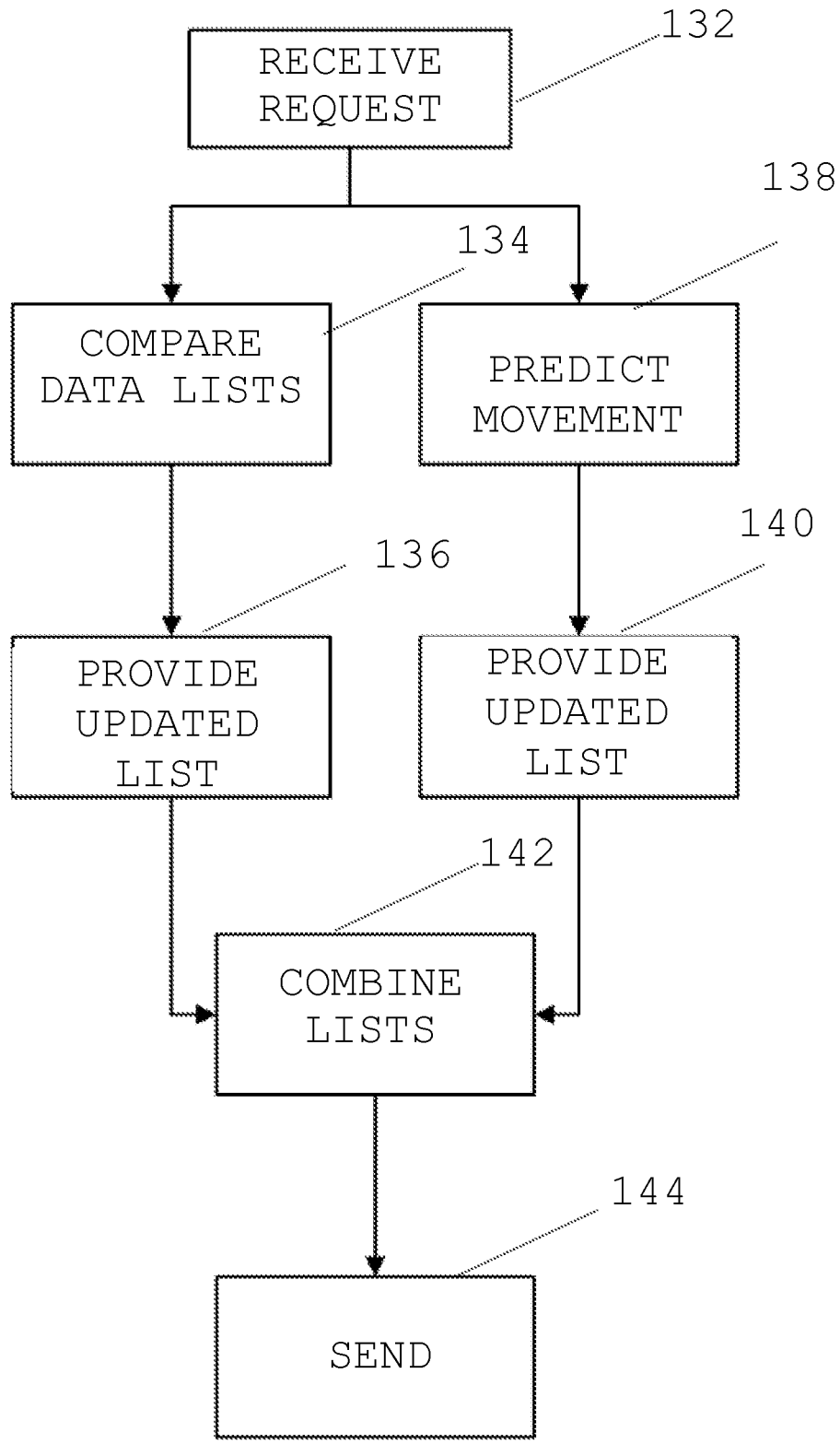
Figures 11, 12:
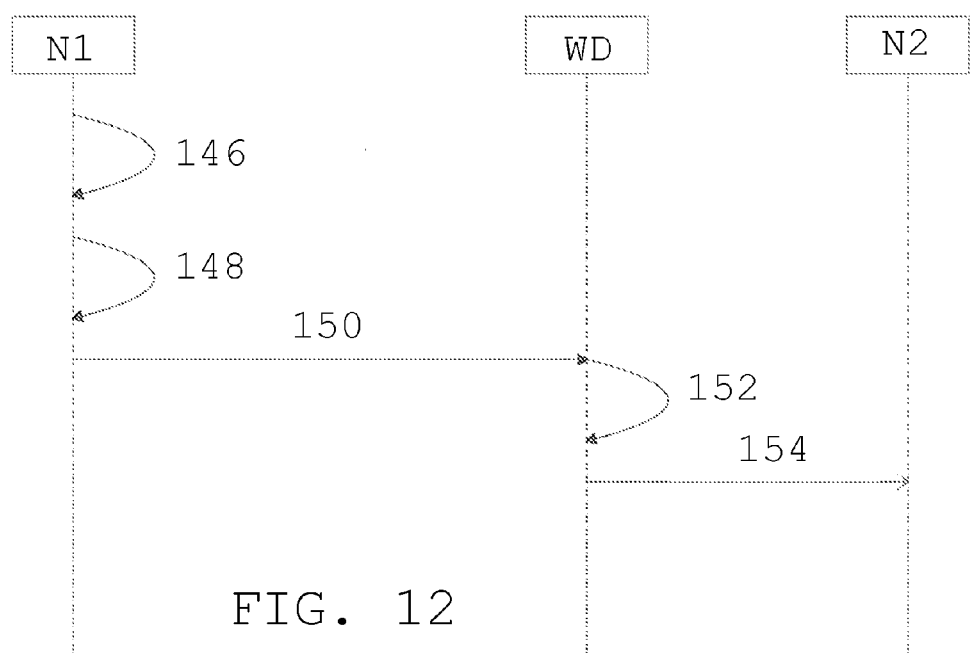
FIG. 11 shows one example of node data being transferred between nodes using a mobile wireless device, FIG. 12 schematically shows one way in which node data can be transferred by a mobile wireless device between two nodes using user data, and FIG. 13 schematically shows a communication network at a road where vehicles comprise mobile wireless devices.

A further variation of the invention will now be described with reference to FIGS. 9, 10, 11 and 12, where FIG. 9 shows communication between the first node and the mobile wireless device, FIG. 10 shows processing performed in the first node, FIG. 11 shows one example of node data and FIG. 12 shows the handling of node data and user data for access limitation purposes.

The node data is in this case the list shown in FIG. 11, which list passes through the nodes N1, N2, N3, N4 and N5 of the network. In this list there is data of which node and the time TS at which it passed by it.

The first node 12 and mobile wireless device 18 first establishes the first short-range communication link 20, which may be a secure link 120. If the mobile wireless device 18 is in possession of node data, such as the list, then this is transferred or otherwise a NIL input is provided to the first node 12, 122. In case there is user data with an access limitation, this limitation may then be removed. Thereafter the mobile wireless device 18 requests node data in the form of an updated list or node data for nodes in the determined direction, which node data may be considered to be a geographical direction based data list, 124. In the first node the possibly received data list is evaluated and updated or a new list is provided. Alternatively the direction is predicted, 126. In parallel with this prediction, the user data UD is obtained and linked to the node data ND for instance using encryption, 128. Thereafter the updated node data in the form of an updated data list and/or geographical direction user data list is provided to the mobile wireless device 18, 128, which thereafter may display the status 130.

The processing in the first node N1 may furthermore be the following. A request concerning a data list is first received, step 122. The request may be a request for a data list, request for update of a data list and/or geographical based data list. Then two parallel processing paths are used. In a first path the data list from the mobile wireless device 18 is compared with an own data list, 134, and then a first updated data list is provided based on a time stamp of the mobile terminal and the own data list, 136. The above-mentioned activity is part of a status update of the stored nodes. If the received list has newer status, the stored data list will be updated. In the second path, the direction of movement of the mobile wireless device is predicted based on the data list obtained from the mobile wireless device, 138, and a second updated data list based on the predicted direction of movement is provided, 140. The second task is thus to estimate the travel direction of the mobile wireless device. If GPS data is available from the mobile wireless device, it will be used. However, if GPS data is not available, the estimation can be done from the collected data and the timestamps. Since the first node 12 knows the location of the other nodes, it can estimate the travel direction based on the times TS at which the data was collected at these other nodes. Once the travel direction is estimated, the first node will create node data to be carried by the mobile wireless device. The first and second updated lists may be combined based on the request from the mobile wireless device, 142. The node data is then encrypted before it is sent to the mobile wireless device, 144.

When the node data ND is provided as a data list it includes identifiers N2, N3, N4 and N5 of other nodes, status of measurements, other variables Xi and Yi and time stamps TS of the measurement, etc.

As was mentioned above, one strategy to make the transportation of data more attractive to the user is to offer an incentive. The solution described below will show how this can be achieved.

In an initial state the first node 12 has node data ND ready to be transmitted (in the following referred to as Content) and user data in the form of an incentive for the user.

The first task is to prepare both the content and the incentive to be ready to be transmitted to a mobile wireless device. This means that the Content might have to be encrypted (if the content is of a sensitive nature), 146. To make sure that the Incentive is useless to the user without him or her carrying the Content, the enciphered Content is used as a cryptographic key when enciphering the Incentive, 148. Usually data is encrypted using a rather short key (like 64 or 128 bits) because the purpose of the key is only to provide strong enough security. However to use a massive key as in this case can be achieved in a number of ways. The simplest solution is perhaps to use parts of the Content as keys to several block ciphers. For instance the use of the encryption algorithm Blowfish with a variable key length of maximum 448 bits would still be possible to use by for instance using every 1000th bit of the Content as part of the encryption key (1000*448 b=56 kB). Another strategy is to encrypt the Incentive in several parts, which could give interesting benefits; the more data you help to carry the better quality of the incentive you get.

The result of this is ciphered Content and a ciphered Incentive, where Content is the key to decrypt the Incentive and the key to decrypt Content is pre-shared between the different nodes.

These are then combined into one single entity ready to be transported, 150, to the mobile wireless device nearby via protocols such as Bluetooth or ZigBee. The mobile wireless device can then provide the encrypted content to the second node N2, 154, and also consume the incentive, 152.

One advantage of this approach is that the Content and the Incentive are connected with each other in such a way that the user cannot consume the Incentive without carrying the Content between the nodes.

There are a number of different scenarios where the above described node data and user data may be used.

One example is the area of waste disposal stations and trash cans. This is however not the only situation where this kind of distribution of data is interesting.

Another interesting example could for instance be to apply the principles to Shinkansen, the world's most busy high-speed rail lines located in Japan. Between Tokyo and Osaka each train has 1235 passengers and in total 375,000 people are transported every day. Imagine that each passenger receives node data from a ticket machine and leaves the data at the coffee machine at arrival. The node data could for instance be HD-videos from the security cameras of all railway stations.

The more data you carry the less you have to pay for the coffee and the better quality you will receive of the incentive, like an ad-free news channel to watch on your way to your work.

Even if only 10% of the 375,000 persons will carry node data and they only have 10 Gb free space on their mobile wireless devices. The storage available on a device is already today quite extensive (for instance an iPhone 4s can have 64 Gb) and an increase of the available space in the future could be expected. In the future the speed of the data layer will increase further, right now Bluetooth 3.0 HS has a speed at 24 MBit/s and WiFi 802.11n standard is significantly faster at 600 Mbps. Anyway the result of this example is that the Tokaido Shinkansen would be able to transport 375 000 Gb daily.

Another area where node data may be used is in the case of emergencies. Then all mobile wireless devices may be set to transport node data and thereby information of for instance an accident can be spread quickly between nodes.

Figure 13:
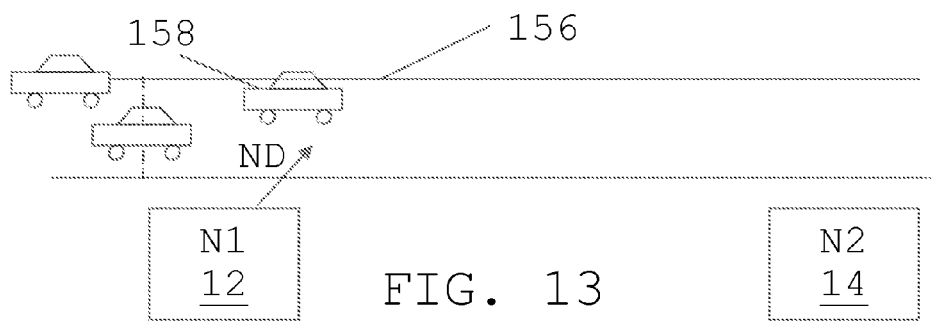

Yet another area where node data may be employed is along roads. FIG. 13 shows one such example where the first and second nodes 12 and 14 are provided along a road 156. The first mobile wireless terminal may in this case be provided in a vehicle 158 that travels on the road and receives node data ND from the first node 12 for transport to the second node 14. The mobile wireless terminal may therefore be a part of the vehicle, with the short-range communicating unit provided on or as a part of the exterior of the vehicle, for instance as a part of a license plate. However, it may also be a portable device brought into the vehicle by a user. As one example the nodes may be provided at gas stations or recreational areas at the side of the road. The nodes may also be road condition data gathering nodes, which gather road condition data. Road condition data may be weather data such as temperature or data concerning weather conditions such as moisture, rain or snow. Road condition data may also be traffic situation data, like if there are queues, road works etc. In this way it is possible to transfer node data up and down the road, which may be used to warn drivers of problems further along the road.

The node mapping unit, node control unit and access limitation handler may be provided in the form of a processor with associated program memory including computer program code for performing the functionality of these entities. These entities may also be provided in the form of a digital signal processor (DSP). Also the wireless device control unit may be provided in this way.

A computer program may also be a computer program product, for instance in the form of a computer readable storage medium or data carrier, like a CD ROM disc or a memory stick, carrying such a computer program with the computer program code, which will implement the functionality of the above-described untis and handler.

While the invention has been described in connection with what is presently considered to be most practical and preferred embodiments, it is to be understood that the invention is not to be limited to the disclosed embodiments, but on the contrary, is intended to cover various modifications and equivalent arrangements. It should for instance be realized that it is possible to use the determination of the direction of movement of a mobile wireless device without access restrictions to user data. The first embodiment may therefore as an example be combined with predicting the direction of movement of the mobile wireless device in order to determine nodes that are to receive node data or with providing user data with access limitations. Therefore the invention is only to be limited by the following claims.

The invention claimed is:

1. A stationary short-range wireless communication device (SRWCD) acting as a node of a network in which nodes are isolated from each other, the stationary short-range wireless communication device comprising:

a short-range communication unit (SRCU) for short-range communication with at least one mobile wireless device (WD) and configured to detect the mobile wireless device being in the vicinity of the node;

a node data memory (NDM) configured to store node data (ND) intended for at least one other node of the network and user data (UD) intended for a user of the mobile wireless device (WD);

a node control unit (NCU) configured to control transfer of data between the node and the mobile wireless device, which transfer comprises the transfer of the node data (ND) and the user data (UD), wherein the node data (ND) is transported between the node and the at least one other node of the network via the mobile wireless device (WD); and an access limitation providing unit (ALPU) configured to provide an access limitation to the user data (UD), at least a part of which can only be removed when the node data (ND) has been delivered to the at least one other node of the network.

2. The stationary short-range wireless communication device according to claim 1, wherein the node data memory comprises said node data intended for the at least one other node and the node control unit, when controlling the transfer of data, is configured to control the transfer of said node data (ND) in the node data memory to the mobile wireless device in order to be transported to said at least one other node.

3. The stationary short-range wireless communication device according to claim 2, further comprising a node mapping unit (NMU) configured to obtain position data (PD) of previous positions of a detected mobile wireless device and determine a direction of movement of the mobile wireless device based on the position data (PD), and the node control unit is configured to provide the mobile wireless device with node data (ND) intended for a node in the determined direction.

4. The stationary short-range wireless communication device according to claim 3, further comprising data of the positions of other nodes of the network and the node mapping unit, when determining the direction of movement, is configured to determine the direction of movement based on the mobile wireless device having collected node data from the other nodes of the network.

5. The stationary short-range wireless communication device according to claim 1, wherein the access limitation providing unit is configured to encrypt the user data using at least a part of said node data.

6. The stationary short-range wireless communication device according to claim 1, wherein the node control unit, when controlling the transfer of data between the mobile wireless device and said at least one other node, is configured to receive the node data from a detected mobile wireless device and store it in the node data memory, said node data originating from another node in the network.

7. The stationary short-range wireless communication device according to claim 6, wherein said detected mobile wireless device delivering the node data (ND) has user data (UD) linked to this node data, said user data being provided with the access limitation and the stationary short-range wireless communication device further comprising an access limitation removal unit configured to remove the access limitation from the user data (UD).

8. A method of communicating node data (ND) between a stationary short-range wireless communication device (SRCWD) and a mobile wireless device (WD), wherein the stationary short-range wireless communication device acts as a node of a network in which nodes are isolated from each other, the method being performed in the stationary short-range wireless communication device and comprising the steps of:

detecting at least one mobile wireless device in the vicinity of the node;

controlling transfer of data between the mobile wireless device and the node, said transfer of data comprising the transfer of the node data (ND) and user data (UD), wherein the node data is transported between the node and at least one other node of the network via the mobile wireless device (WD); and providing an access limitation to the user data (UD), at least a part of which can only be removed when the node data (ND) has been delivered to the at least one other node of the network.

9. The method according to claim 8, wherein the controlling of the transfer of data comprises controlling the transfer of the node data (ND) from the node to the mobile wireless device in order to be transported to said at least one other node.

10. The method according to claim 9, further comprising obtaining position data (PD) of previous positions of the mobile wireless device, determining the direction of movement of the mobile wireless device, and providing the mobile wireless device with node data (ND) intended for a node in the determined direction.

11. The method according to claim 8, wherein the controlling of the transfer of data between the mobile wireless device comprises receiving the node data (ND) from a detected mobile wireless device, said node data originating from another node in the network.

12. The method according to claim 11, wherein said detected mobile wireless device delivering the node data (ND) has user data (UD) linked to this node data (ND), said user data being provided with the access limitation and the method further comprises removing the access limitation from the user data.

13. A mobile wireless device (WD) for communication with stationary short-range wireless communication devices (SRCWD) acting as nodes of a network that are isolated from each other, the mobile wireless device comprising:

a short-range communication unit (SRCU) for short-range communication with the nodes of the network;

a wireless device data memory (WDDM) configured to store node data (ND) relating to the nodes of the network; and a wireless device control unit (WDCU) configured to:

receive, via the short-range communication unit, data from a first node, said data comprising the node data (ND) intended for another network node and user data (UD) intended for a user of the mobile wireless device (WD), wherein the user data (UD) is provided with an access limitation;

store said node data (ND) in the wireless device data memory;

determine, using the short-range communication unit, if the mobile wireless device is in the vicinity of the other network node;

if the mobile wireless device is in the vicinity of the other network node, transfer the node data (ND) and the user data (UD) to the other network node; and communicate with the other network node in order to have the access limitation removed from the user data (UD), which can only be removed when the node data (ND) has been delivered to the other network node.

14. The mobile wireless device according to claim 13, further comprising a data presenting unit configured to present the user data (UD) for the user of the mobile wireless device.

15. The mobile wireless device according to claim 13, wherein the access limitation is an encryption of the user data (UD) using at least a part of the node data (ND) as a key.

16. The mobile wireless device according to claim 13, wherein the wireless device data memory comprises position data (PD) of previous positions of the mobile wireless device and the wireless device control unit is further configured to transfer the position data (PD) to the first node before receiving the node data (ND).

17. A vehicle comprising the mobile wireless device according to claim 13.

18. A method of transporting node data (ND) from a stationary short-range wireless communication device, wherein said stationary short-range wireless communication device acts as a first node of a network in which nodes are isolated from each other, the method being performed in a mobile wireless device and comprising:

receiving, via a first short-range communication link, data from the first node, said data comprising the node data (ND) intended for another network node and user data (UD) intended for a user of the mobile wireless device, wherein the user data (UD) is provided with an access limitation;

storing said node data (ND) in a wireless device data memory (WDDM);

determining, using a second short-range communication link, if the mobile wireless device is in the vicinity of the other network node;

if the mobile wireless device is in the vicinity of the other network node, transferring the node data (ND) and the user data (UD) to the other network node; and communicating with the other network node in order to have the access limitation removed from the user data (UD), which can only be removed when the node data (ND) has been delivered to the other network node.

19. The method according to claim 18, further comprising transferring position data (PD) of previous positions of the mobile wireless device to the first node before receiving the node data (ND).

* * * * *